(12) United States Patent
Aston et al.

(10) Patent No.: US 11,111,088 B2
(45) Date of Patent: Sep. 7, 2021

(54) SOD ROLL STACKING TECHNIQUE

(71) Applicant: FireFly Automatix, Inc., North Salt Lake, UT (US)

(72) Inventors: Eric E. Aston, Farmington, UT (US); Steven R. Aposhian, Farmington, UT (US); William M. Decker, Salt Lake City, UT (US); Mark C. LeBlanc, Salt Lake City, UT (US); Austin J. Neuner, Layton, UT (US); Sam B. Jensen, Centerville, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 0 days.

(21) Appl. No.: 16/741,585

(22) Filed: Jan. 13, 2020

(65) Prior Publication Data
US 2021/0214173 A1  Jul. 15, 2021

(51) Int. Cl.
| | | |
|---|---|---|
| *B65G 57/03* | (2006.01) | |
| *A01G 20/15* | (2018.01) | |
| *B65G 57/14* | (2006.01) | |
| *B65G 61/00* | (2006.01) | |
| *B65G 57/18* | (2006.01) | |

(52) U.S. Cl.
CPC ............ *B65G 57/03* (2013.01); *A01G 20/15* (2018.02); *B65G 57/14* (2013.01); *B65G 57/186* (2013.01); *B65G 61/00* (2013.01)

(58) Field of Classification Search
CPC ...... B65G 57/03; B65G 57/14; B65G 57/186; B65G 61/00; A01G 20/15
USPC ............................................ 414/789.8, 791.2
See application file for complete search history.

(56) References Cited

U.S. PATENT DOCUMENTS

| | | | | |
|---|---|---|---|---|
| 4,777,890 | A  * | 10/1988 | Raymond ............. | A01G 20/15 111/100 |
| 5,269,379 | A  * | 12/1993 | Millar ................... | A01G 20/15 172/19 |
| 6,783,318 | B2 * | 8/2004 | Tvetene ................ | A01G 20/15 414/789.7 |
| 7,096,967 | B2 * | 8/2006 | Pohlman, Jr. ......... | A01G 20/15 172/20 |
| 7,467,667 | B2 * | 12/2008 | Pohlman, Jr. ......... | A01G 20/15 172/20 |
| 10,524,429 | B1 * | 1/2020 | Tvetene ................ | B65G 37/00 |
| 10,743,479 | B2 * | 8/2020 | Brouwer ............... | A01G 20/15 |
| 2020/0323153 | A1 * | 10/2020 | Aposhian .............. | A01G 20/15 |

* cited by examiner

*Primary Examiner* — Lynn E Schwenning
(74) *Attorney, Agent, or Firm* — Kirton McConkie; Brian Tucker

(57) ABSTRACT

Sod harvesters are configured to stack rolls of sod in layers on a rectangular pallet. A sod harvester can include control circuitry that is configured to operate a stacking head and a stacking conveyor in a manner that produces a first type of layer that includes spaced groups of accumulated rolls and a number of offset rolls positioned between the groups. The stacking head can pick up and stack each offset roll in isolation and may pick up the offset rolls in a center position of the stacking head.

20 Claims, 14 Drawing Sheets

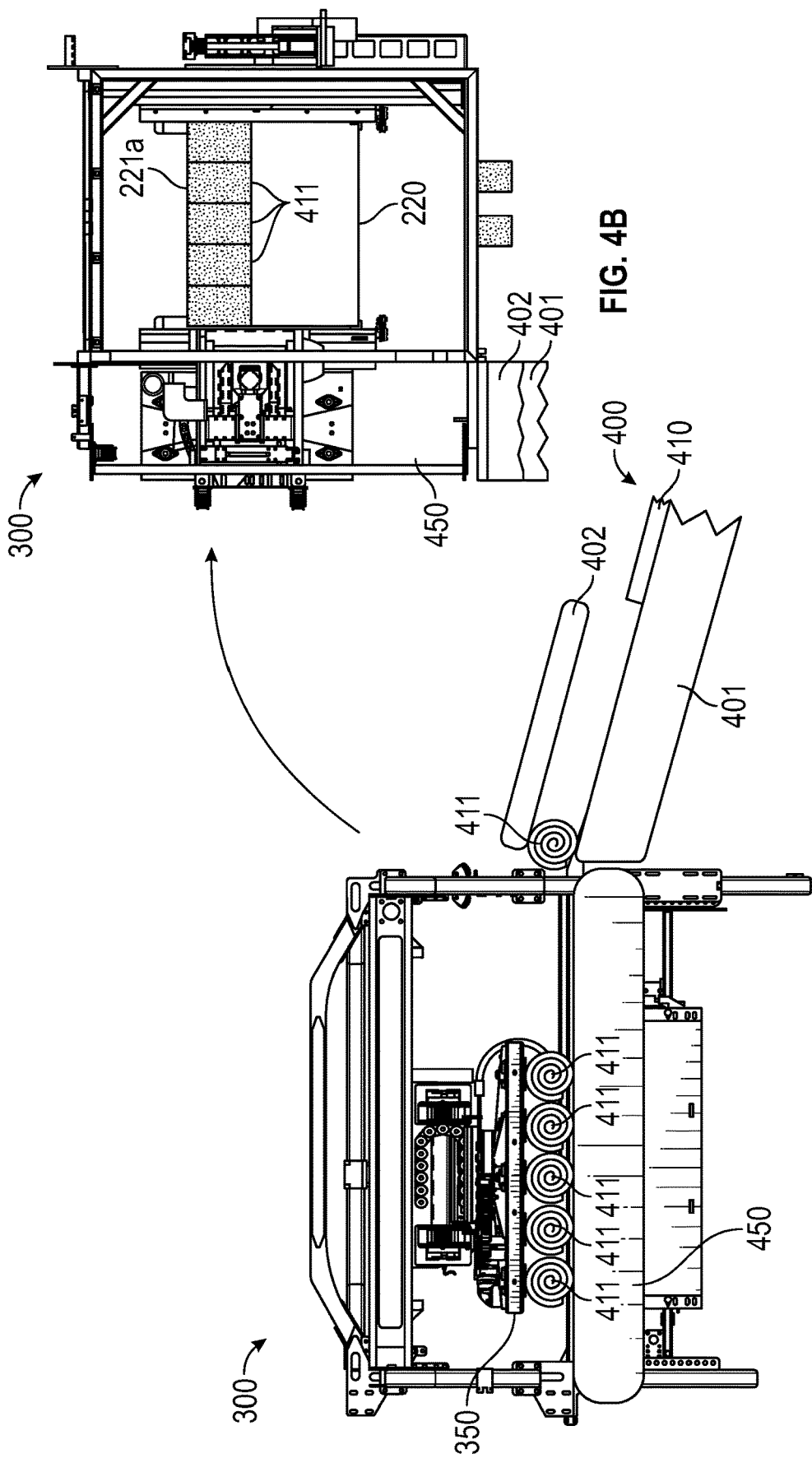

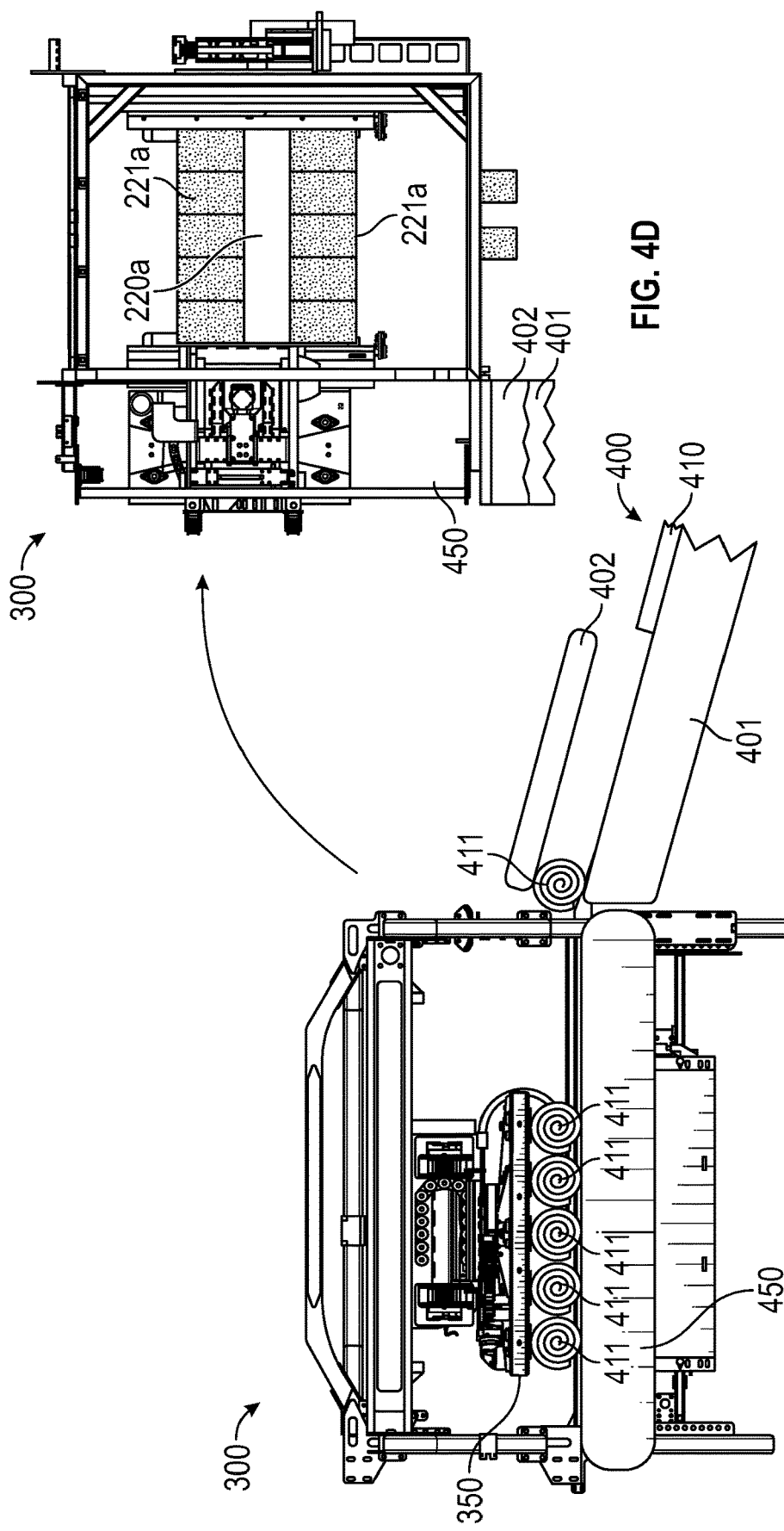

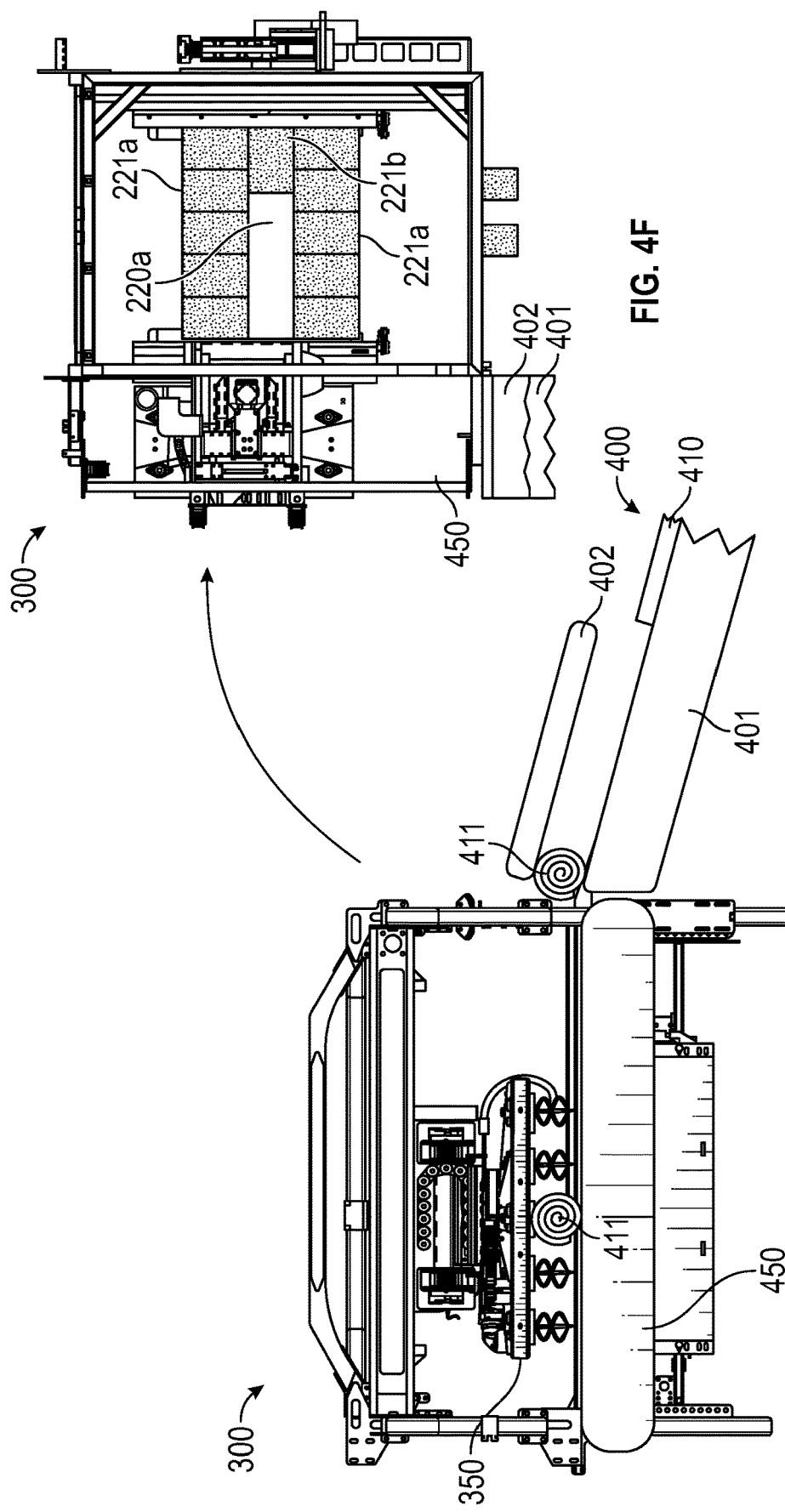

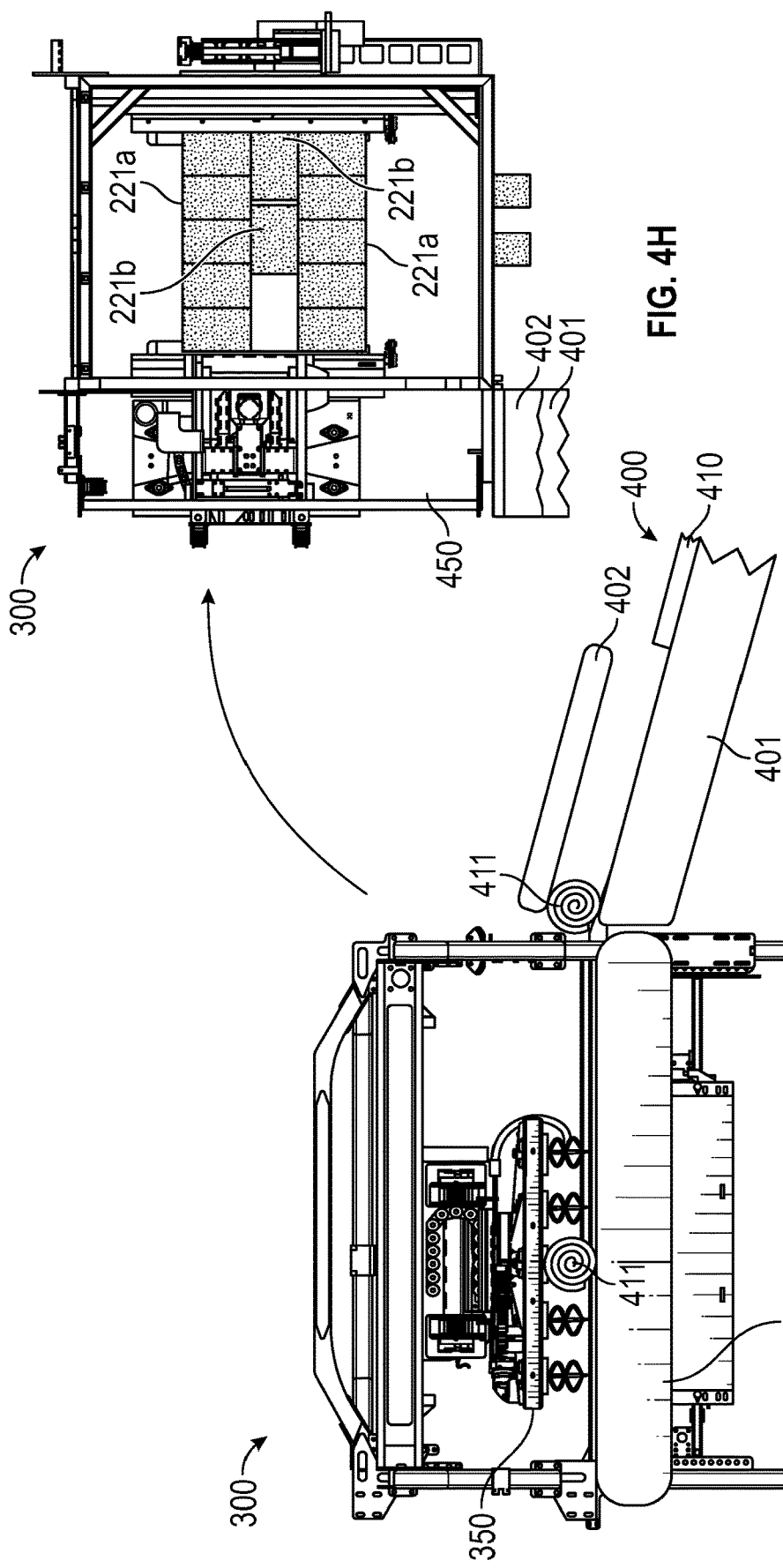

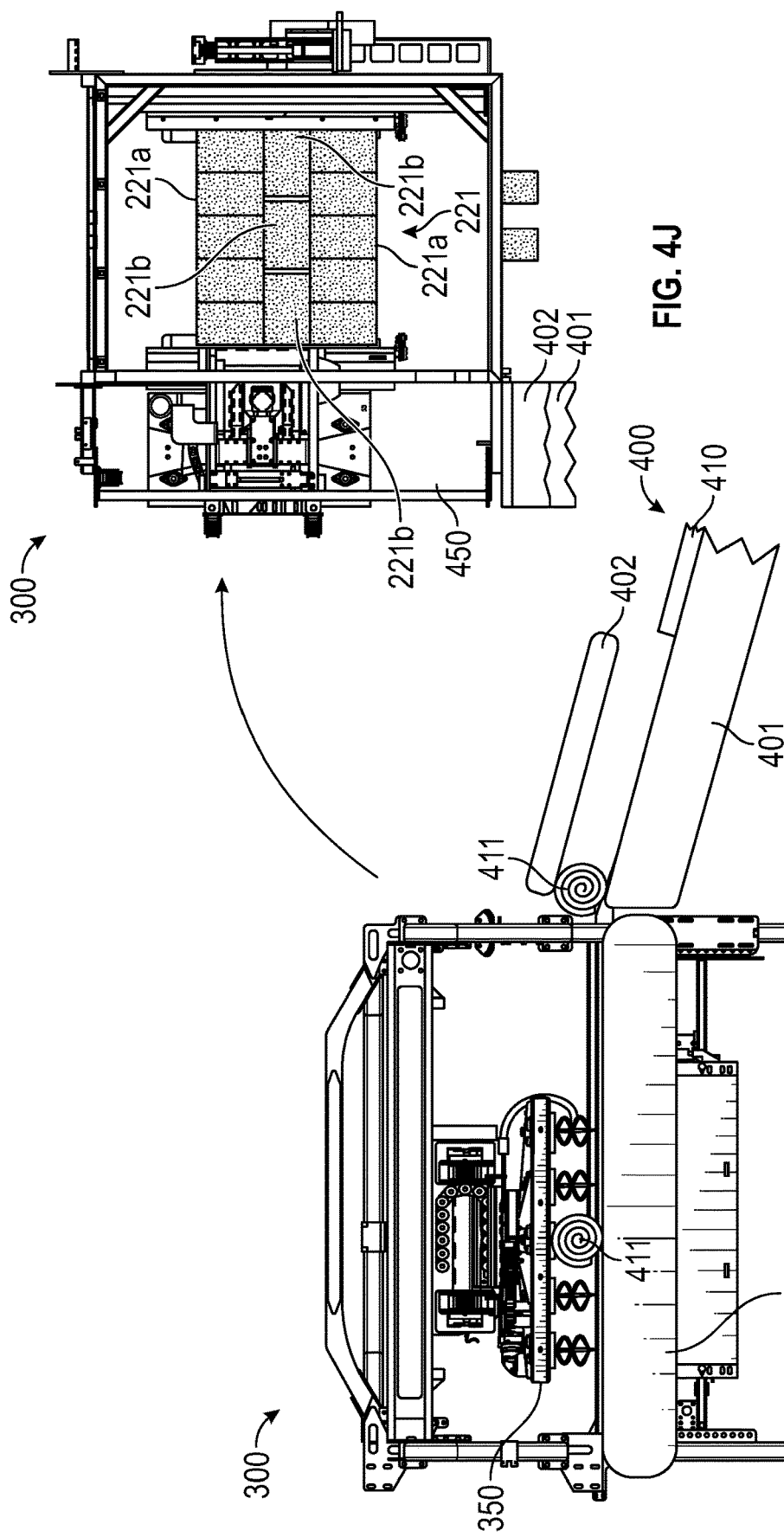

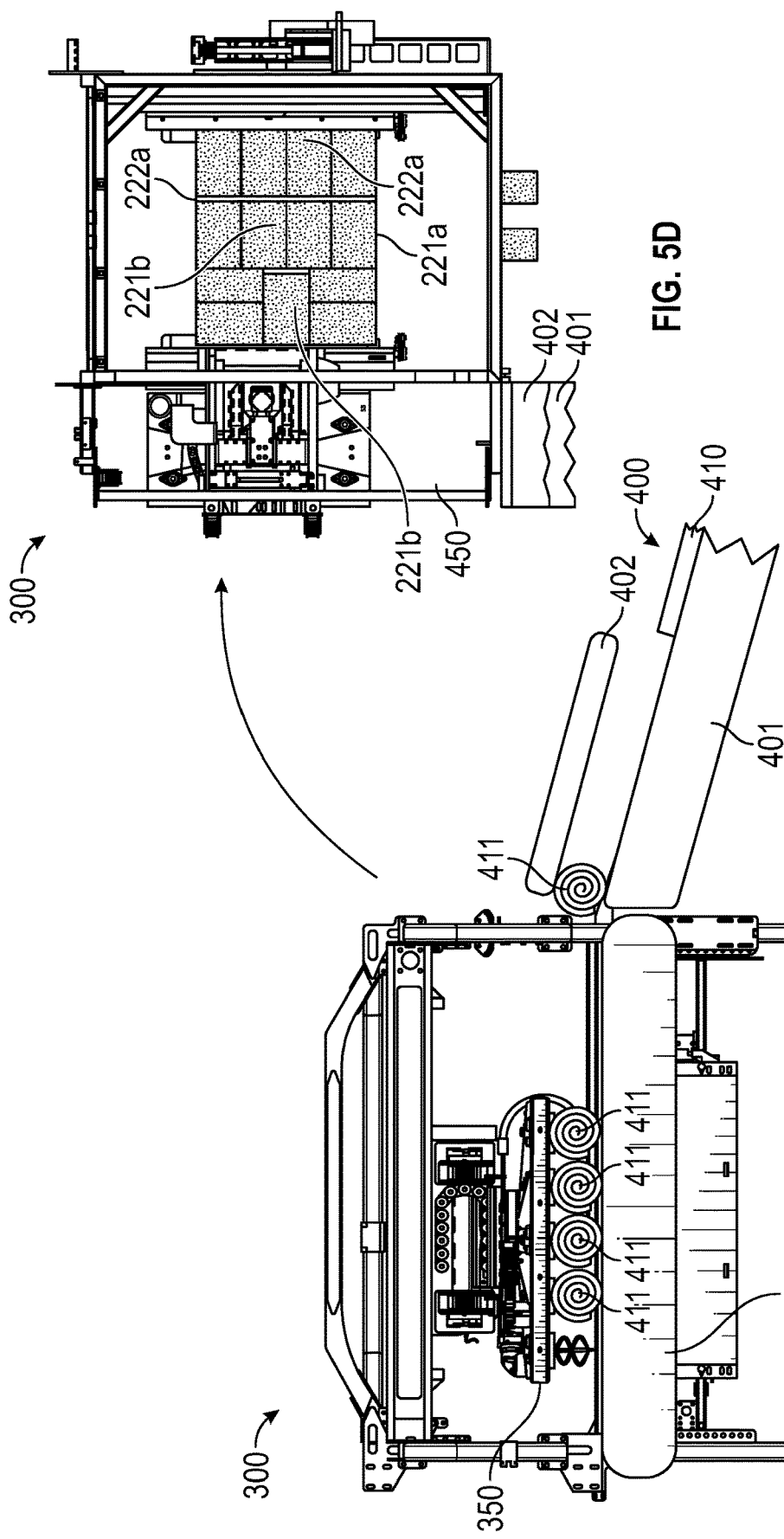

SOD ROLL STACKING TECHNIQUE

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1. Sod harvester 100 is in the form of a tractor and includes a cutting head 101 that cuts slabs of sod from the ground, inclined conveyor(s) 102 that elevate the slabs from the ground towards a stacking conveyor 103, a stacking head 105 that is mounted to a support mechanism 104, and a pallet dispenser 106 that is positioned adjacent a pallet support (not visible) on which stacking head 105 stacks slabs that it has removed from stacking conveyor 103.

Two general types of harvesters exist: slab harvesters and roll harvesters. A roll harvester forms the slabs of sod into rolls which are then accumulated on the stacking conveyor for pick up. A slab harvester, on the other hand, directly stacks the slabs in their flat form. Sod harvester 100 represents a slab harvester.

When rolls are stacked on a pallet, it is common to orient the rolls in each layer with a 90 degree offset relative to the adjacent layers. This orientation of the rolls facilitates forming pallets that are stable and minimizes the likelihood that a roll may fall off the pallet. FIG. 2A illustrates two different sizes of pallets that may be used to stack sod. Pallet 210, which is 48 inches (1.2 meters) by 48 inches (1.2 meters), is commonly used in the United States. Pallet 220, which is 48 inches (1.2 meters) by 40 inches (1.0 meter), is commonly used in the United Kingdom. Because pallet 210 has a square shape, each row can include the same number of rolls. This is not the case with pallet 220 due to its rectangular shape.

FIG. 2B illustrates how rolls are commonly stacked on pallets 210 and 220. With pallet 210, each row 211 includes the same number of groups 211a which in this case is two. Each group 211a also includes the same number of rolls which in this case is five. Depending on the width and thickness of the rolls, a row 211 could include a different number of groups 211a and groups 211a could include a different number of rolls. Of importance is the fact that the same number of groups 211a having the same number of rolls can be stacked in each layer 211 on pallet 210 due to its square shape.

In contrast, with pallet 220, rolls are stacked in two different types of layers. Layer 221 is formed of two groups 221a of rolls that are spaced apart and a number of offset rolls 221b that are positioned in the space between groups 221a. In contrast, layer 222 is formed of three groups 222a of rolls that are positioned adjacent one another.

As shown in FIG. 2B, layer 221 is used when groups 221a are oriented so that the width of the rolls extends along the shorter side of pallet 220. In this context, the width of a roll is synonymous with the width of the slab as is shown in FIG. 2B. As an example, assuming the width of the rolls is 16 inches, the total width of two groups 221a will be 32 inches leaving 8 inches of the 40 inch pallet unoccupied. These 8 inches are insufficient to stack another group 221a in the same orientation. For this reason, groups 221a are stacked along the opposing longer sides of pallet 220 to form a space in which offset rolls 221b can be stacked with a 90 degree rotation from the rolls in groups 221a. Groups 221a can be spaced sufficiently to allow offset rolls 221b to fit between the groups including by extending one or both of the groups beyond the edge of the pallet. In the illustrated example, there are three offset rolls 221b between each pair of groups 221a.

Once layer 221 is formed, which may or may not be the first layer on pallet 220, a layer 222 can be formed by stacking three groups 222a on top of layer 221 with the rolls in each group 222a being rotated 90 degrees relative to the rolls in groups 221a. Again assuming the width of the rolls is 16 inches, the 48 inch length of the longer side of pallet 220 will accommodate the total width of 48 inches of the three groups. However, because of the 40 inch length of the shorter side of pallet 220, groups 222a will include four rolls as opposed to the five rolls in groups 221a. The inclusion of offset rolls 221b in layer 221 ensure that the rolls in layer 222 will remain level on pallet 220 (i.e., there will not be an open space into which the rolls of group 222a may fall). In some cases, after a desired number of layers 221 and 222 have been formed, other layers 223 may be formed at the top of the stack. These other layers 223 may give the stack a pyramid-shape to minimize the likelihood of tipping. However, it is equally possible that the stack could be formed only of layers 221 and 222.

In the above-described example, the number of groups, the number of rolls in the groups, the dimensions of the rolls and the dimensions of the pallet are exemplary only. In other implementations, other numbers and dimensions may be employed. Of importance is the fact that the two different layers 221 and 222 are used when stacking rolls on a rectangular pallet.

BRIEF SUMMARY

The present invention extends to sod harvesters that are configured to stack rolls of sod in layers on a rectangular pallet and to methods for stacking rolls of sod in layers on a rectangular pallet. A sod harvester can include control circuitry that is configured to operate a stacking head and a stacking conveyor in a manner that produces a first type of layer that includes spaced groups of accumulated rolls and a number of offset rolls positioned between the groups. The stacking head can pick up and stack each offset roll in isolation and may pick up the offset rolls in a center position of the stacking head.

In one embodiment, the present invention is implemented as a sod harvester that includes: a pallet support assembly that is configured to support a pallet; a stacking conveyor that is configured to receive rolls of sod; a stacking head that is configured to pick up the rolls of sod from the stacking conveyor and stack the rolls of sod on the pallet; and control circuitry for controlling the stacking conveyor and the stacking head. The control circuitry is configured to operate the stacking conveyor and the stacking head to form a first type of layer on the pallet. The first type of layer includes two groups of rolls and a plurality of offset rolls. The control circuitry forms the first type of layer by causing the stacking head to pick up and stack each of the offset rolls in isolation, and by causing the stacking head to pick up and stack each of the two groups of rolls where each group includes an accumulated plurality of rolls. The control circuitry causes the stacking head to stack the offset rolls between the two groups of rolls.

In another embodiment, the present invention is implemented as a method for stacking rolls of sod on a pallet. The sod harvester forms a first type of layer on the pallet. The first type of layer includes a plurality of groups of rolls and a plurality of offset rolls. The sod harvester forms the first type of layer on the pallet by: for each of the plurality of offset rolls, causing a stacking head to pick up and stack the offset roll on the pallet in isolation; and causing the stacking head to pick up and stack each of the plurality of groups of rolls on the pallet, each group comprising an accumulated plurality of rolls. The offset rolls are stacked in a center region of the pallet and each of the groups of rolls is stacked along a side of the pallet.

In another embodiment, the present invention is implemented as a method for forming a pallet of rolls of sod. Alternating first and second types of layers are formed on the pallet. Each first type of layer includes a plurality of first groups of rolls and a plurality of offset rolls. Each second type of layer includes a plurality of second groups of rolls. Each first type of layer is formed by: picking up and stacking each offset roll on the pallet in isolation; and picking up and stacking each of the plurality of first groups of rolls on the pallet, each first group of rolls including a first number of rolls, the offset rolls being stacked in between the plurality of first groups of rolls. Each second type of layer is formed by: picking up and stacking each of the plurality of second groups of rolls on the pallet, each second group of rolls including a second number of rolls, the second number being less than the first number.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 4A-4J illustrate how a first type of layer is formed on a rectangular pallet in accordance with embodiments of the present invention; and FIGS. 5A-5F illustrate how a second type of layer is formed on the rectangular pallet in accordance with embodiments of the present invention.

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle.

Figure 1:
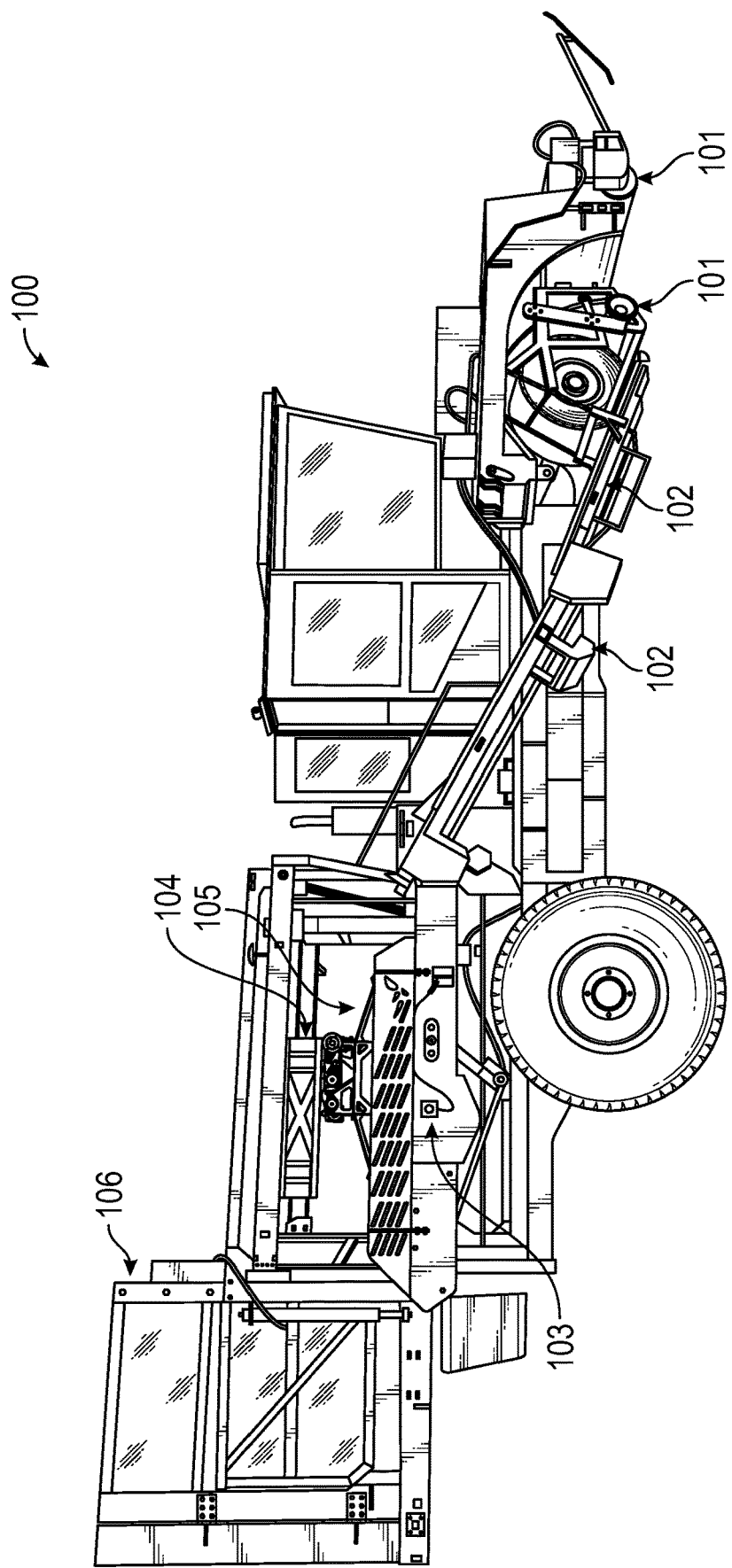
FIG. 1 illustrates a prior art sod harvester that includes a stacking head for stacking slabs of sod.
Figure 2A:
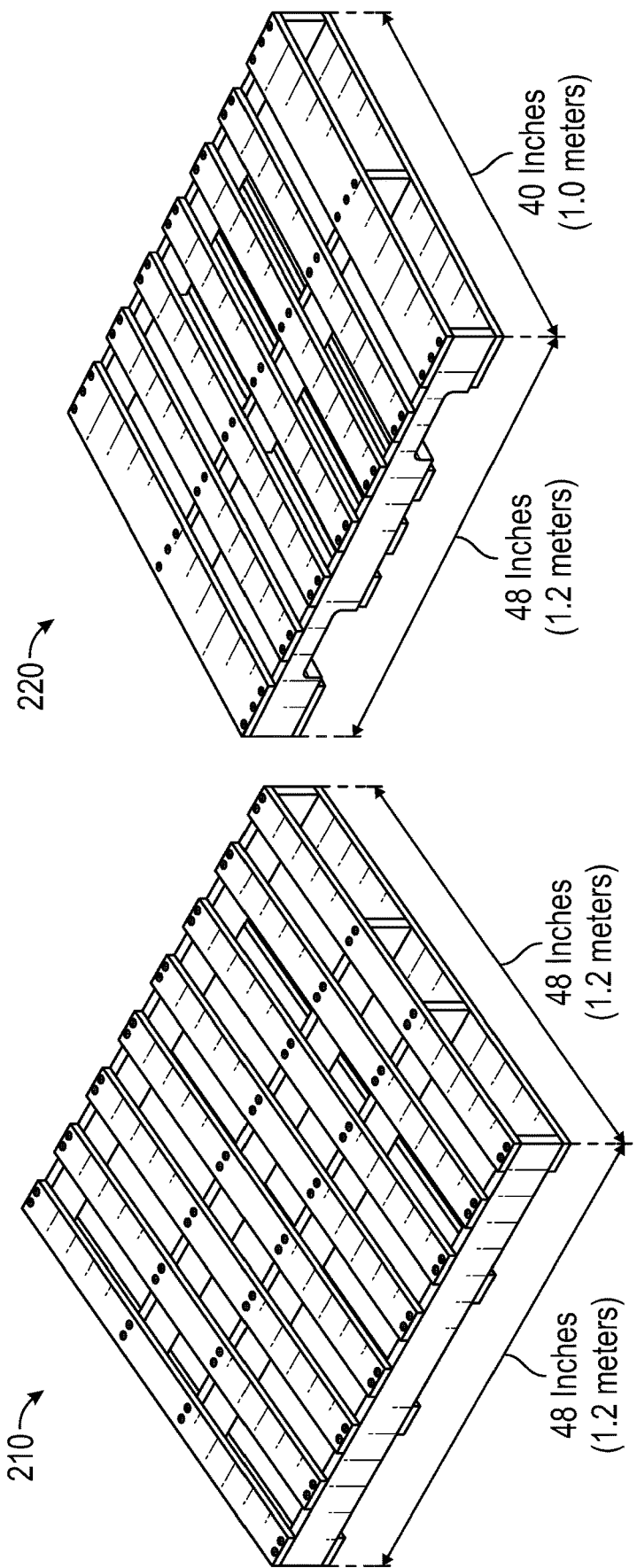
FIG. 2A illustrates square and rectangular pallets that can be used to stack rolls of sod.
Figure 2B:
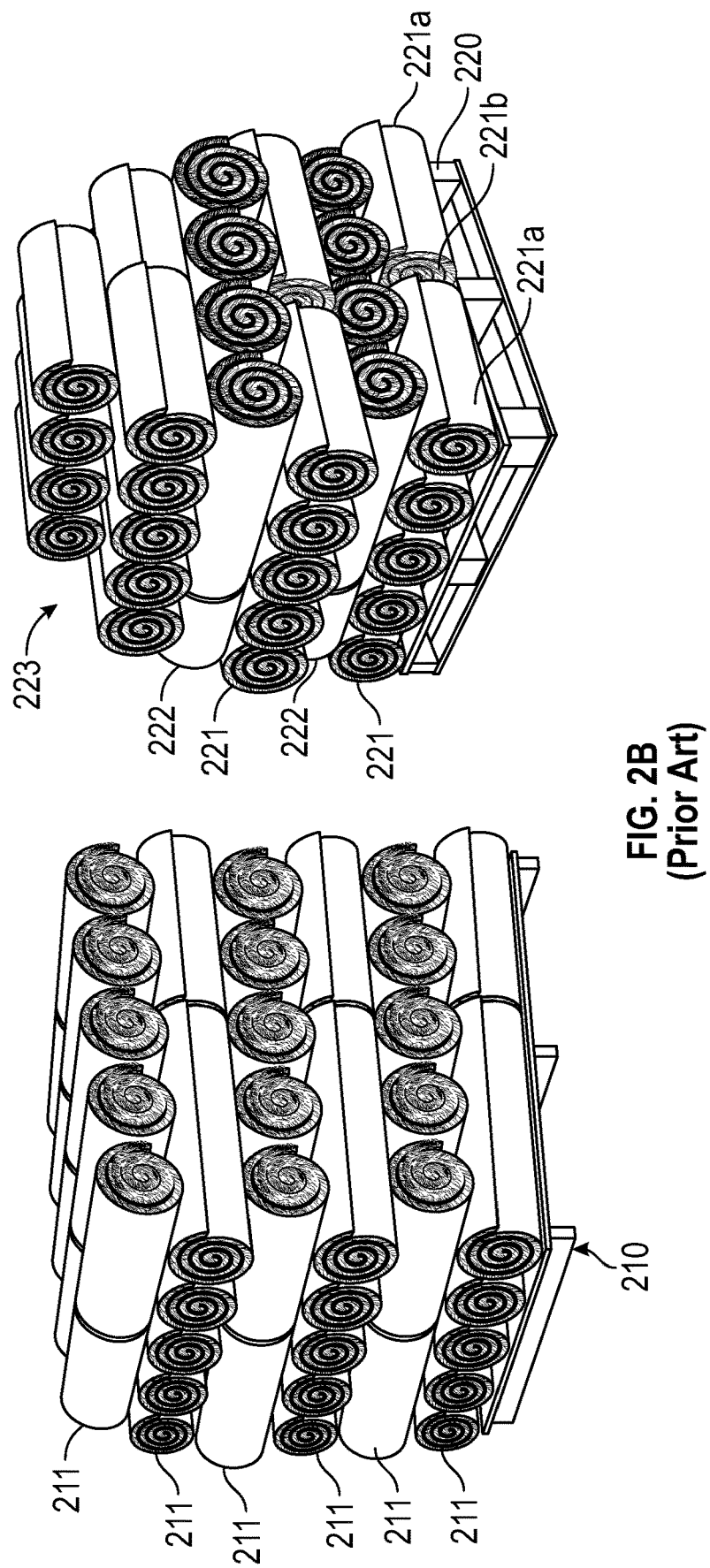
FIG. 2B illustrates how rolls of sod can be stacked on the square and rectangular pallets.
Figure 3:
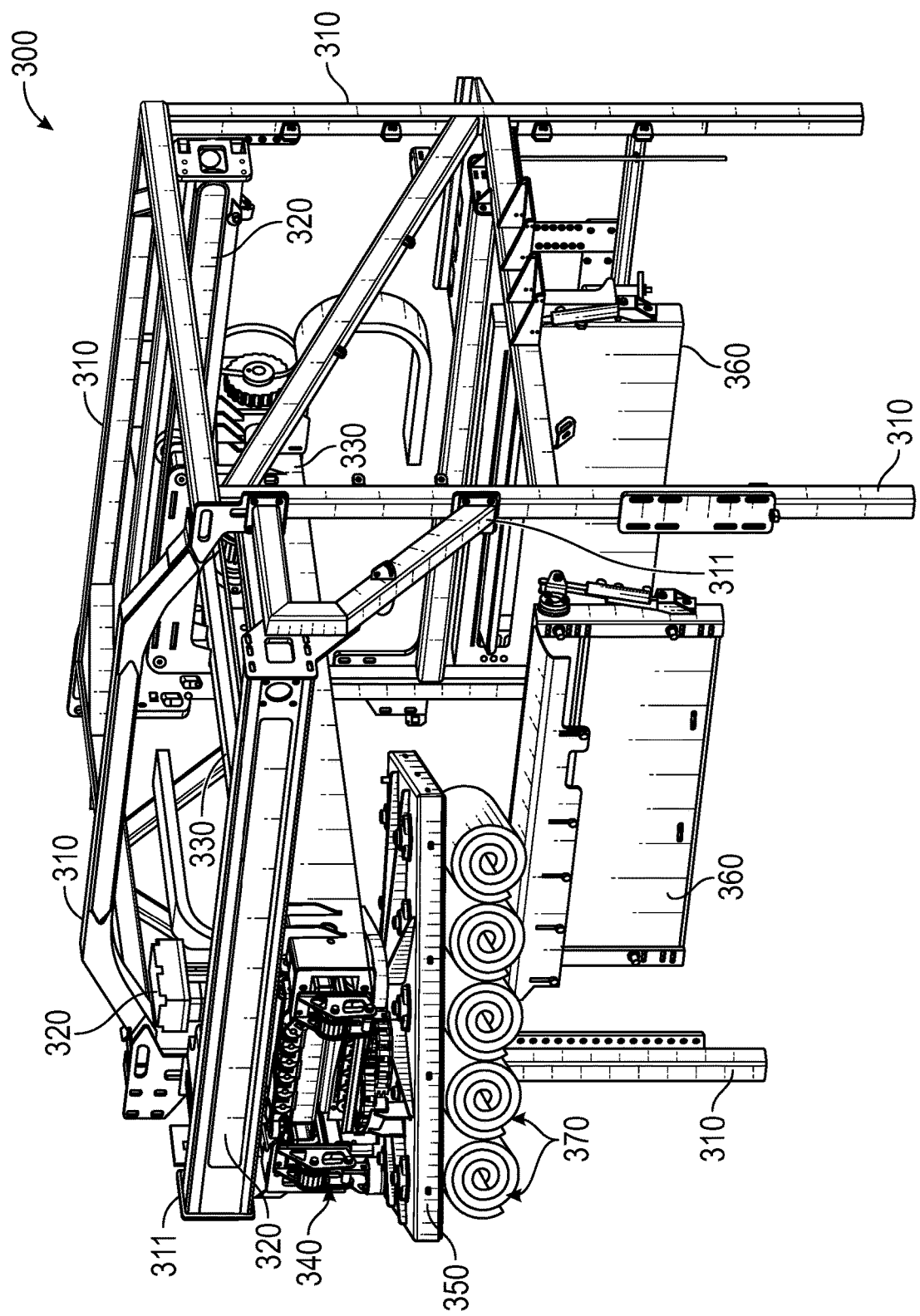
FIG. 3 illustrates an exemplary stacker assembly that can be used on a sod harvester to implement embodiments of the present invention.

FIG. 3 illustrates a stacker assembly 300 that can be employed on a sod harvester (e.g., in place of what is shown in FIG. 1). Stacker assembly 300 represents only one example of a sod harvester stacker assembly that can be used to implement embodiments of the present invention. Although not illustrated in FIG. 3, a sod harvester that includes stacker assembly 300 would also include a mechanism for forming sod into rolls. The specific type of roll-forming mechanism is not essential to the present invention. One suitable roll-forming mechanism that can be used on a sod harvester that implements embodiments of the present invention is described in U.S. patent application Ser. No. 16/370,995 titled FORMING A SOD ROLL which is incorporated herein by reference.

Stacker assembly 300 includes a frame 310 by which stacker assembly 300 can be coupled to the sod harvester. Frame 310 forms a generally rectangular shape within which a stacking head 350 travels. Opposing hanger brackets 311 extend from one side of frame 310. Although not shown, a stacking conveyor (similar to stacking conveyor 103) would typically be positioned below hanger brackets 311 and would be configured to rotate to advance rolls of sod 370 under stacking head 350. Stacker assembly 300 also includes a pallet support assembly 360 which is configured to support a pallet on which rolls 370 can be stacked.

To enable stacking head 350 to move along each of the x, y and z axes, stacker assembly 300 includes an x axis assembly 320, a y axis assembly 330 and a carriage assembly 340 that is configured to move along the z axis and to rotate. A detailed explanation of each of these assemblies may be found in U.S. patent application Ser. No. 16/379,251 titled SOD ROLL STACKING HEAD (the "'251 application") which is incorporated herein by reference.

Figure 3A:
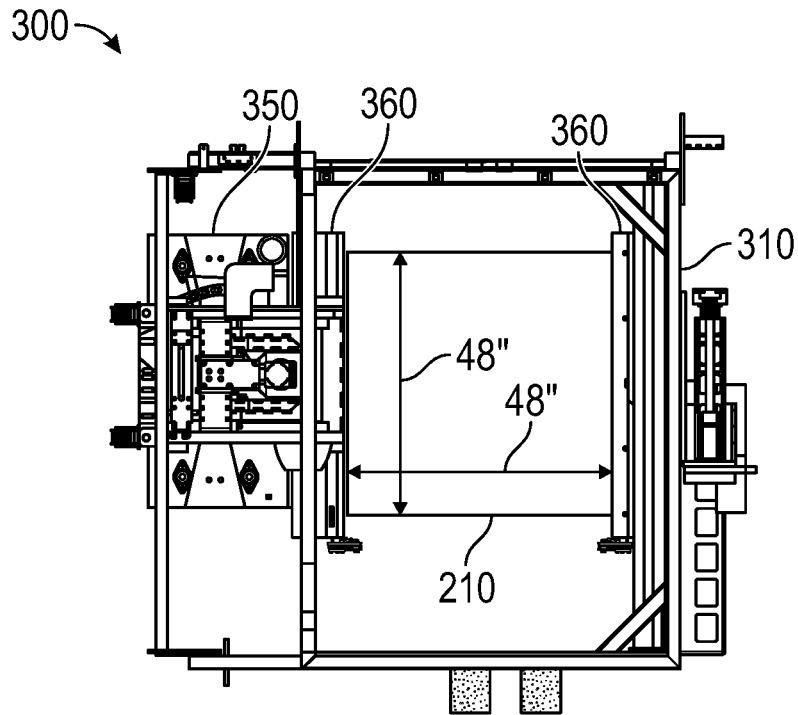
FIGS. 3A and 3B illustrate how the square and rectangular pallets can be accommodated within the stacker assembly shown in FIG. 3.
Figure 3B:
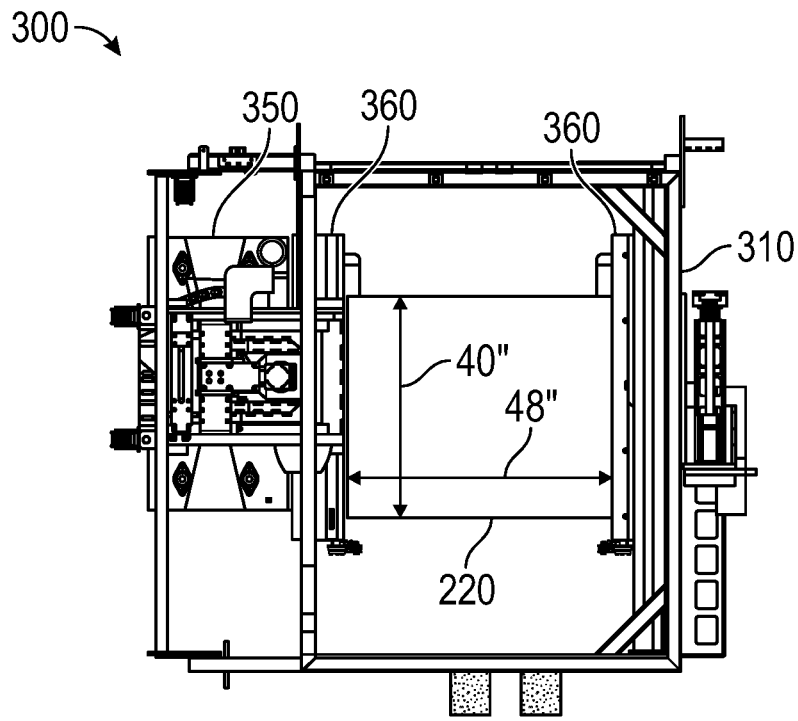

FIGS. 3A and 3B, which provide top views of stacker assembly 300 with various components removed so that the pallets are fully visible, illustrates how pallets 210 and 220 can be supported by pallet support assembly 360. In the depicted example, the arms of pallet support assembly 360 are spaced 48 inches apart so that pallet support assembly 360 can accommodate either of pallets 210 or 220. However, it is equally possible that the arms could be spaced by 40 inches to accommodate pallet 220 in the opposite orientation from what is shown. In operation, stacking head 350 can pick up rolls while in the position shown in FIGS. 3A and 3B and then travel overtop pallet 210/220 to stack the rolls. Stacker assembly 300 can include control circuitry which is configured to operate stacking head 350 and the stacking conveyor (not shown) in accordance with a unique method to cause rolls to be stacked on pallet 220 in layers 221 and 222. This control circuitry can be any suitable type of circuitry such as a processor, a microcontroller, an FPGA, an ASIC, a PLC, etc.

Figure 3C:
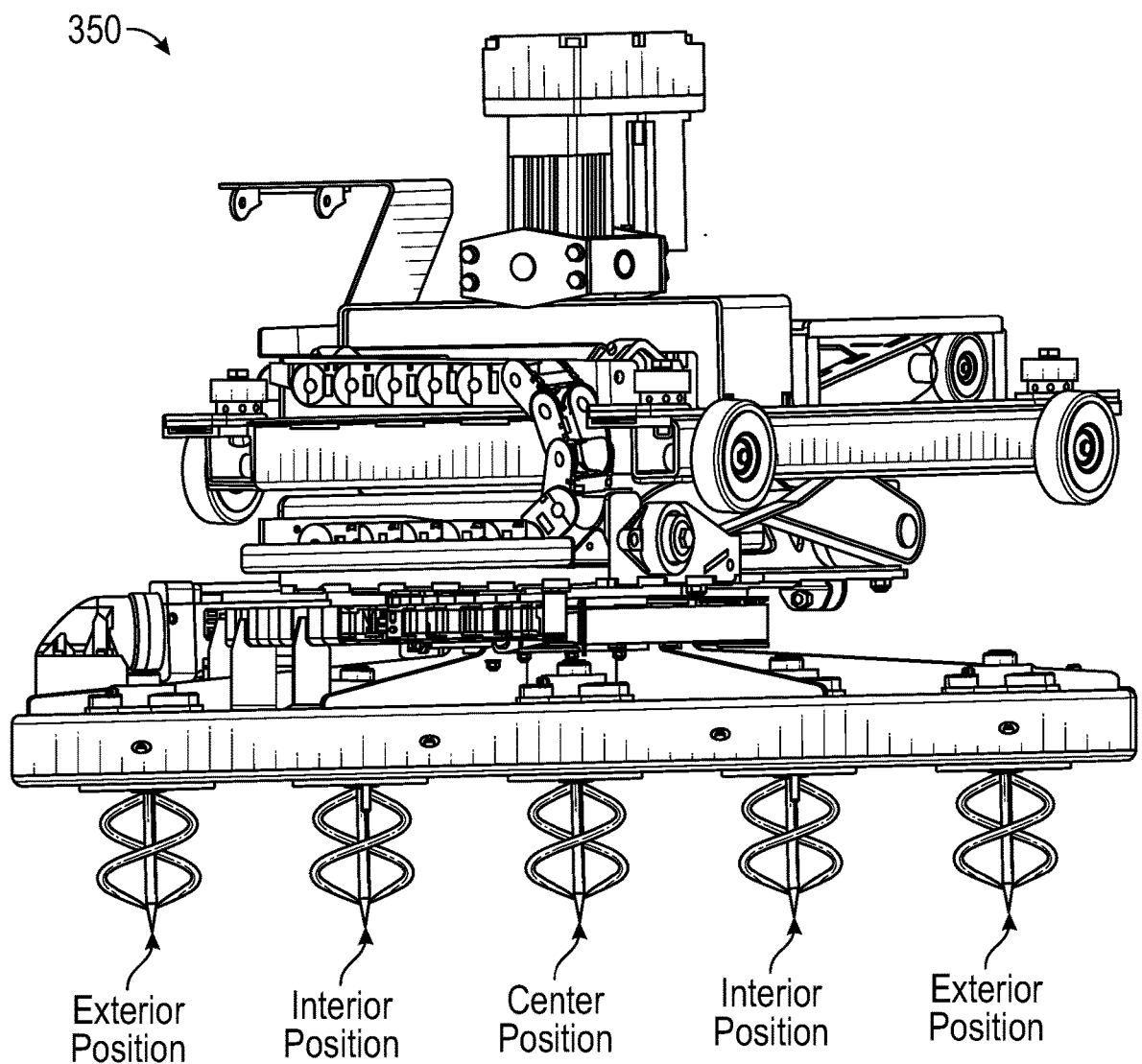
FIG. 3C illustrates a stacking head of the stacker assembly in isolation and identifies that the stacking head is configured to pick up five rolls of sod.

FIG. 3C provides a side view of stacking head 350 in isolation. Stacking head 350 is configured to pick up and stack up to five accumulated rolls at a time. Stacking head 350 therefore accommodates five "pick up positions": the "center position;" two "interior positions" on opposing sides of the center position; and two "exterior positions" that are positioned adjacent the interior position opposite the center position. Stated another way, the particular pick up position can be defined relative to the stacking head with reference to the particular pair of screw assemblies (see element 300 in the '251 application) or other similar component(s) that are used to pick up the particular roll.

FIGS. 4A-4J and 5A-5F illustrate how stacker assembly 300 can be operated by the sod harvester's control circuitry to cause rolls 411 to be stacked in layers 221 and 222 on pallet 220. Although not described herein, the control circuitry could also be configured to cause rolls 411 to be stacked in layers 211 on pallet 210. In other words, a sod harvester that implements embodiments of the present invention could be designed to accommodate both square and rectangular pallets by configuring the control circuitry to form layers appropriate for the shape of the pallet that is currently being used.

In the example depicted in FIGS. 4A-4J and 5A-5F, stacker assembly 300 is shown in conjunction with a stacking conveyor 450 and an inclined conveyor assembly 400 that includes at least one inclined conveyor 401 and a roll forming mechanism 402. As suggested above, inclined conveyor assembly 400 is intended to represent any suitable number and configuration of components that can be employed to form rolls of sod as the sod is conveyed from the ground towards stacking conveyor 450. Stacking conveyor 450 can represent any type of conveyor (or conveyors) that may be configured to provide the functionality described below (e.g., the accumulation and/or advancement of roll(s)). These figures are arranged in pairs where the first figure in the pair (e.g., FIG. 4A) provides a side view of stacker assembly 300 when stacking head 350 picks up one or more rolls from stacking conveyor 450 and the second figure in the pair (e.g., FIG. 4B) provides a top view of stacker assembly 300 after stacking head 350 has stacked the one or more rolls on pallet 220. In this example, it will also be assumed that layer 221 includes groups 221a having five rolls and three offset rolls 221b and that layer 222 includes groups 222a having four rolls.

In FIG. 4A, it is assumed that no rolls have been stacked on pallet 220. FIG. 4A also shows that five rolls 411 have been accumulated on stacking conveyor 450, a subsequent roll 411 is being formed between inclined conveyor 401 and roll forming mechanism 402 and a yet-to-be-rolled slab 410 is being advanced along inclined conveyor 401. The positioning of slab 410 and the subsequent roll 411 on inclined conveyor 401 is intended only to represent that slabs are continuously cut from the ground and advanced along inclined conveyor 401 during the process of forming layers 221 and 222. However, the subsequent roll(s) 411 and slab(s) 410 could be in other positions relative to the roll(s) that is/are being stacked at any particular time.

Once five rolls have been accumulated on stacking conveyor 450, the control circuitry can cause stacking head 350 to secure the accumulated rolls 411 and remove them from stacking conveyor 350 as is represented in FIG. 4A. This can be accomplished by positioning the five rolls under stacking head 350 (e.g., by advancing stacking conveyor 450 and/or moving stacking head 350 to cause the five rolls to align with the exterior, interior and center positions of stacking head 350) and then moving stacking head 350 towards stacking conveyor 450 (e.g., by lowering stacking head 350 and/or raising stacking conveyor 450) to cause the rolls to be secured to the stacking head such as is described in the '251 application.

Next, the control circuitry can cause stacking head 350, which is now carrying the five accumulated rolls 411, to travel overtop pallet 220 so that the accumulated rolls 411 are positioned along one of the longer sides of pallet 220. In the depicted embodiment, this would require a 90 degree rotation of stacking head 350, but may not require any rotation in embodiments where pallet 220 is in the other orientation relative to stacking conveyor 450. With the accumulated rolls 411 positioned along the longer side of pallet 220, stacking head 350 can release the rolls so that they are positioned as a group 221a of a layer 221. As depicted in FIG. 4B, once the rolls are released, stacking head 350 can return to a position overtop stacking conveyor 450 to await the next roll(s) to be stacked. Accordingly, FIGS. 4A and 4B represent how a group 221a of a layer 221 can be formed on pallet 220.

FIGS. 4C and 4D illustrate that the control circuitry can operate stacking conveyor 450 and stacking head 350 in a similar manner to form another group 221a of the layer 221 on pallet 220. In particular, the control circuitry can cause another five rolls 411 to be accumulated on stacking conveyor 450 and then cause stacking head 350 to pick up and stack the accumulated rolls along the opposite longer side of pallet 220. As identified in FIG. 4D, after both groups 221a of the layer 221 have been stacked on pallet 220, a center region 220a of pallet 220 will remain unoccupied.

Turning to FIG. 4E, stacking conveyor 450 is shown as having advanced a single roll 411 so that it is isolated on stacking conveyor 450. The single roll 411 can be positioned in isolation so that it will be in the center position when it is secured by stacking head 350 and removed from stacking conveyor 450. FIG. 4E represents that the next roll 411 remains on inclined conveyor 401 when the single, isolated roll 411 is picked up in the center position. However, it is also possible that the next roll 411 may have already been advanced onto stacking conveyor 450. Of importance is the fact that the single, isolated roll is spaced sufficiently from the next roll so that stacking head 350 can pick up a single roll. Although the single roll is shown as being picked up in the center position, it is also possible that the single roll could be picked up in either of the interior positions or in either of the exterior positions. However, by isolating the single roll in the center position, it will be unnecessary to accommodate over-travelling of stacking head 350 as will be described below.

With the single, isolated roll 411 picked up, stacking head 350 can then travel overtop pallet 220 so that the roll 411 is positioned above center region 220a and is rotated 90 degrees relative to the rolls in groups 221a (i.e., so that the roll 411 is parallel with the longer sides of pallet 220). Stacking head 350 can then release the roll in center region 220a so that it becomes one of the offset rolls 221b in the layer 221. Once releasing the roll, stacking head 350 can travel back overtop stacking conveyor 450.

As mentioned above, one benefit of picking up the single, isolated roll in the center pick up position is that stacking head 350 will be in a "center" position when stacking the single, isolated roll (i.e., it will be generally centered overtop pallet 220). In contrast, if the single, isolated roll is picked up in one of the other positions, stacking head 350 will need to travel forward or backward relative to the longer sides of pallet 220 to position the roll overtop center region 220a. Many stacker assemblies may include structure that would prevent such over-travelling. For example, a stacker assembly may include a pallet injector that is positioned immediately rearward of pallet 220. In such cases, stacking head 350 may not be able to travel in a rearward direction sufficiently to stack a single roll that is isolated in either the frontward interior position or the frontward exterior position.

FIGS. 4G and 4H illustrate that stacking head 350 can return to pick up a second single, isolated roll 411 and stack it in the center region 220a of pallet 220. FIGS. 4I and 4J similarly illustrate that stacking head 350 can return to pick up a third single, isolated roll 411 and stack it in the center region 220a of pallet 220 to thereby create a completed layer 221. In the claims, this process of picking up and stacking a single roll as an offset roll will be referred to as picking up and stacking an offset roll in isolation. The phrase "picking up and stacking an offset roll in isolation" should be construed as a stacking head picking up a single roll from a stacking conveyor and then stacking the single roll as an offset roll 221b on a pallet as part of forming a layer 221.

To summarize, when forming a layer 221, stacking conveyor 450 and stacking head 350 can be operated to cause the three offset rolls 221b to be isolated, picked up and stacked individually in the center region 220a of pallet 220 so that they extend parallel to the longer sides of pallet 220 and to cause the two groups 221a to be accumulated, picked up and stacked along the opposing longer sides of pallet 220. Although the figures depict a sequence where the two groups 221a are stacked followed by the offset rolls 221b, other orders may be used. For example, stacking conveyor 450 and stacking head 350 may be operated to cause the three offset rolls 221b to be stacked first followed by the two groups 221a (where the two groups could be stacked in either order). Alternatively, stacking conveyor 450 and stacking head 350 may be operated to stack one group 221a, then the three offset rolls 221b and then the second group 221a.

In some embodiments, it may be preferable to form a layer 221 by stacking the offset rolls 221b first and then stacking the two groups 221a. In particular, when the groups 221a are stacked first, it may be necessary to push or otherwise force the offset rolls 221b into the open space between the two groups. This requirement to push the offset rolls 221b may slow the stacking process. In contrast, when the offset rolls 221b are stacked first, they may simply be released on pallet 220 (or on the topmost layer) and then the groups 221a can simply be placed alongside the offset rolls 221b.

The need to push the offset rolls 221b into the layer 221 may also be eliminated by stacking one group 221a, then stacking the offset rolls 221b, and then stack the second group 221a alongside the offset rolls 221b. In this scenario, by stacking the offset rolls 221b so that they are oriented to unroll against the already-stacked group 221a, the offset rolls 221b will not tend to unroll into the space where the second group 221a will need to be stacked.

Figures 5A, 5B:
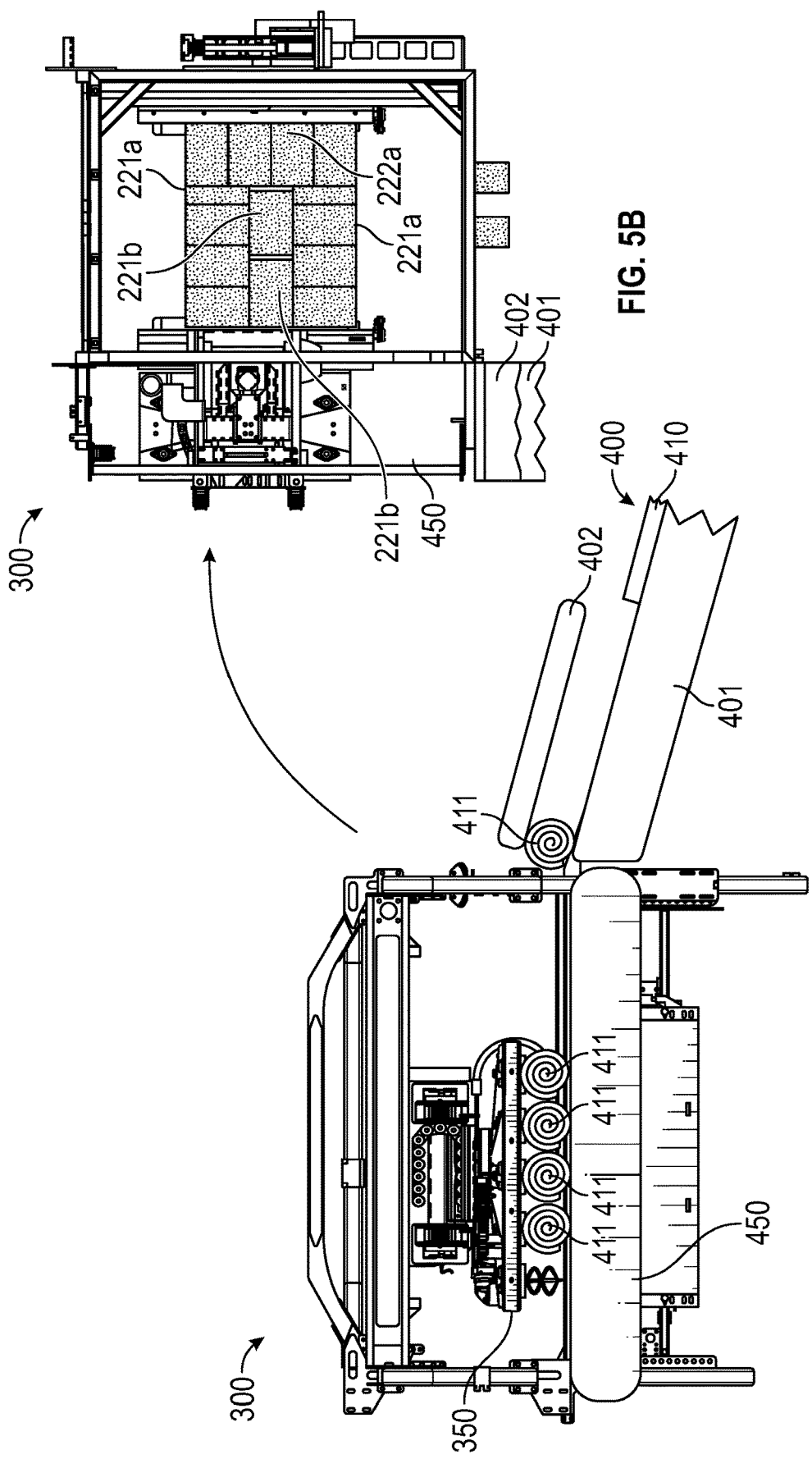
Figures 5E, 5F:
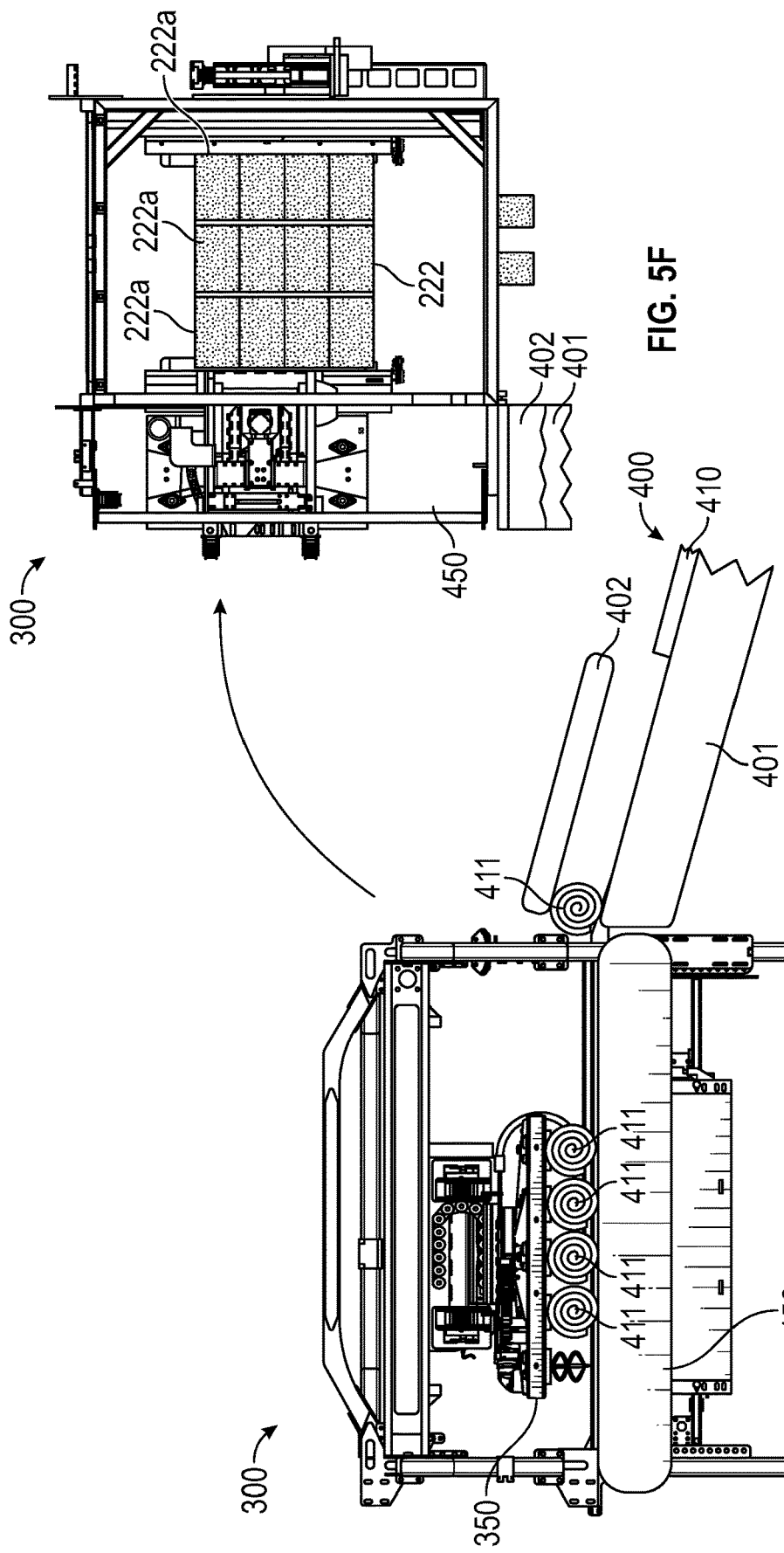

Once layer 221 is formed, stacking conveyor 450 and stacking head 350 can be operated to form a layer 222 on top of layer 221 as is depicted in FIGS. 5A-5F. FIG. 5A represents that four rolls 411 have been accumulated on stacking conveyor 450 and then picked up by stacking head 350. In this example, the four rolls 411 are positioned towards the front of stacking head 350 leaving the rear exterior position unoccupied. However, it is equally possible that the four rolls 411 could be positioned towards the rear of stacking head 350 so that the front exterior position is unoccupied. As shown in FIG. 5B, stacking head 350 can carry the four accumulated rolls overtop pallet 220 so that they extend along the shorter side of pallet 220 and can then release them to form group 222a of layer 222. FIGS. 5C-5F illustrate that this process can be repeated twice so that the three groups 222a of layer 222 are formed on pallet 220. As with forming layer 221, stacking head 350 could form layer 222 by stacking groups 222a in any order.

The process of forming layers 221 and 222 can be repeated until the desired amount of sod has been stacked on pallet 222. For example, a completed pallet could include only alternating layers 221 and 222. Alternatively, stacking conveyor 450 and stacking conveyor 350 could be operated to form other layers 223 on top of the alternating layers 221 and 222. Also, although the figures depict that layer 221 is formed first, it is also possible that layer 222 could be formed first.

The above-described process facilitates the formation of layers 221 without needing to modify the structure of stacking head 350. In other words, the same stacking head can be used to form layers 211, 221 and 222 by implementing control circuitry that is configured to operate the stacking head and the stacking conveyor in a manner that is appropriate for the type of layer that is being formed. This ability to form the different types of layers using the same sod harvester eliminates the need to employ multiple sod harvesters to produce square and rectangular pallets.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:
1. A sod harvester comprising:
a pallet support assembly that is configured to support a pallet;
a stacking conveyor that is configured to receive rolls of sod;
a stacking head that is configured to pick up the rolls of sod from the stacking conveyor and stack the rolls of sod on the pallet; and
control circuitry for controlling the stacking conveyor and the stacking head;
wherein the control circuitry is configured to operate the stacking conveyor and the stacking head to form a first type of layer on the pallet, the first type of layer including two groups of rolls and a plurality of offset rolls, the first type of layer being formed by:
for each of the plurality of offset rolls, causing the stacking head to pick up and stack the offset roll in isolation; and
causing the stacking head to pick up and stack each of the two groups of rolls, each group comprising an accumulated plurality of rolls;
wherein the offset rolls are stacked between the two groups of rolls.
2. The sod harvester of claim 1, wherein each of the plurality of offset rolls is picked up and stacked in isolation before the two groups of rolls are picked up and stacked.
3. The sod harvester of claim 1, wherein each of the plurality of offset rolls is picked up and stacked in isolation after one of the two groups of rolls has been picked up and stacked and before the other of the two groups of rolls is picked up and stacked.
4. The sod harvester of claim 1, wherein each of the plurality of offset rolls is picked up and stacked in isolation after each of the two groups of rolls has been picked up and stacked.

5. The sod harvester of claim 1, wherein each of the plurality of offset rolls is picked up in a center position of the stacking head.

6. The sod harvester of claim 1, wherein causing the stacking head to pick up and stack the offset roll in isolation comprises advancing the stacking conveyor while the offset roll is positioned on the stacking conveyor to thereby isolate the offset roll on the stacking conveyor.

7. The sod harvester of claim 1, wherein the pallet is rectangular, the two groups of rolls are positioned on the pallet to extend along opposing longer sides of the pallet, and each of the offset rolls is positioned at a 90 degree rotation relative to each roll in the two groups.

8. The sod harvester of claim 1, wherein the control circuitry is further configured to operate the stacking conveyor and the stacking head to form a second type of layer on the pallet on top of the first layer, the second type of layer being formed by:
    causing the stacking head to pick up and stack three groups of rolls, each of the three groups of rolls in the second type of layer containing fewer rolls than each of the two groups of rolls in the first type of layer.

9. The sod harvester of claim 8, wherein the plurality of offset rolls comprises three rolls, each of the two groups of rolls in the first type of layer includes five rolls and each of the three groups of rolls in the second type of layer includes four rolls.

10. The sod harvester of claim 1, wherein:
    for each of the plurality of offset rolls, causing the stacking head to pick up and stack the offset roll in isolation comprises, for each of the plurality of offset rolls, causing the stacking conveyor to be advanced to isolate the offset roll on the stacking conveyor; and
    causing the stacking head to pick up and stack each of the two groups of rolls comprises, for each of the two groups of rolls, causing the stacking conveyor to be advanced to isolate the accumulated plurality of rolls.

11. A method for stacking rolls of sod on a pallet, the method comprising:
    causing the sod harvester to form a first type of layer on the pallet, the first type of layer including a plurality of groups of rolls and a plurality of offset rolls, the sod harvester forming the first type of layer on the pallet by performing the following:
        for each of the plurality of offset rolls, causing a stacking head to pick up and stack the offset roll on the pallet in isolation; and
        causing the stacking head to pick up and stack each of the plurality of groups of rolls on the pallet, each group comprising an accumulated plurality of rolls;
    wherein the offset rolls are stacked in a center region of the pallet and each of the groups of rolls is stacked along a side of the pallet.

12. The method of claim 11, wherein the plurality of groups of rolls comprise two groups of rolls that are stacked along opposing longer sides of the pallet.

13. The method of claim 11, wherein causing the stacking head to pick up and stack the offset roll on the pallet in isolation comprises advancing a stacking conveyor on which the offset roll is supported to cause the offset roll to be isolated on the stacking conveyor.

14. The method of claim 11, wherein the plurality of offset rolls comprise three rolls.

15. The method of claim 11, wherein at least some of the plurality of offset rolls are picked up and stacked on the pallet before one or more of the plurality of groups of rolls are picked up and stacked on the pallet.

16. The method of claim 11, wherein all of the plurality of offset rolls are picked up and stacked on the pallet before one or more of the plurality of groups of rolls are picked up and stacked on the pallet.

17. The method of claim 11, wherein at least one of the plurality of offset rolls is picked up in a center position of the stacking head.

18. The method of claim 11, wherein each of the plurality of offset rolls is picked up in a center position of the stacking head.

19. The method of claim 11, further comprising:
    causing the sod harvester to form a second type of layer on the pallet on top of the first type of layer, the second type of layer including a plurality of additional groups of rolls, the sod harvester forming the second type of layer on the pallet by performing the following:
        causing the stacking head to pick up and stack each of the additional groups of rolls, each of the additional groups of rolls containing fewer rolls than each of the plurality of groups of rolls in the first type of layer, each roll in the additional groups of rolls being oriented parallel to each offset roll in the first type of layer.

20. A method for forming a pallet of rolls of sod, the method comprising:
    forming alternating first and second types of layers on the pallet, each first type of layer including a plurality of first groups of rolls and a plurality of offset rolls, each second type of layer including a plurality of second groups of rolls;
    wherein each first type of layer is formed by:
        picking up and stacking each offset roll on the pallet in isolation; and
        picking up and stacking each of the plurality of first groups of rolls on the pallet, each first group of rolls including a first number of rolls, the offset rolls being stacked in between the plurality of first groups of rolls; and
    wherein each second type of layer is formed by:
        picking up and stacking each of the plurality of second groups of rolls on the pallet, each second group of rolls including a second number of rolls, the second number being less than the first number.

* * * * *